United States Patent [19]

Selby, III

[11] 4,246,101

[45] * Jan. 20, 1981

[54] WATER RECYCLING SYSTEM

[75] Inventor: Howard W. Selby, III, Boulder, Colo.

[73] Assignee: Pure Cycle Corporation, Boulder, Colo.

[*] Notice: The portion of the term of this patent subsequent to Mar. 20, 1996, has been disclaimed.

[21] Appl. No.: 974,043

[22] Filed: Dec. 28, 1978

Related U.S. Application Data

[63] Continuation-in-part of Ser. No. 762,103, Jan. 24, 1977, Pat. No. 4,145,279.

[51] Int. Cl.³ .............................................. C02F 9/00
[52] U.S. Cl. .................... 210/615; 210/96.1; 210/143; 210/662; 210/669; 210/739
[58] Field of Search ....................... 210/17, 25, 27, 29, 210/35, 64, 73 R, 73 S, 86, 96–98, 102–105, 108, 134, 135, 141–143, 150, 151, 167, 257.1, 257.2, 266, 269, 275, 284, 297, 319, 321 R, 326, 331, 332, 393, 402, 501, 40; 364/107, 510

[56] References Cited

U.S. PATENT DOCUMENTS

| | | | |
|---|---|---|---|
| 3,268,441 | 8/1966 | Lindstrom | 210/22 |
| 3,276,458 | 10/1966 | Iversen et al. | 210/167 |
| 3,487,016 | 12/1969 | Zeff | 210/63 R |
| 3,527,718 | 9/1970 | Coburn | 210/35 |
| 3,635,817 | 1/1972 | Zuckerman et al. | 210/40 |
| 3,949,207 | 4/1976 | Savary et al. | 364/510 |
| 3,985,648 | 10/1976 | Casolo | 210/37 R |
| 4,145,279 | 3/1979 | Selby | 210/17 |

Primary Examiner—Ivars C. Cintins
Attorney, Agent, or Firm—Woodcock, Washburn, Kurtz, Mackiewicz & Norris

[57] ABSTRACT

A closed water recycling system produces potable drinking water from total domestic waste-water, including household sewage. The system includes filtration and demineralization units. An electronic controller, which is preferably a microprocessor, monitors the operation of the system and automatically cleans the filter assembly, operates the demineralizer when the monitored variables indicate this is necessary, acts as a failsafe monitor to insure water quality, and shuts down the system in case of a malfunction. For example, the demineralizer may include acid and base regenerated resin beds in an ion-exchange system. When a monitor indicates that the beds require regeneration, acid and base regenerating solutions are supplied to the beds. The flow of regenerating solution and rinse is controlled by the electronics which sense conditions at the bed outlet. By stopping regeneration and rinse at certain points, a saving in regenerating solution and a reduction in rinse water are both effected, thus keeping the water losses from regeneration to a minimum. (It is desirable to have only a small amount of by-product water, of high salt concentration, to dispose of). Organic reduction is used in conjunction with the above process to reduce the requirement of physically removing and disposing of organic sludges and solids.

25 Claims, 5 Drawing Figures

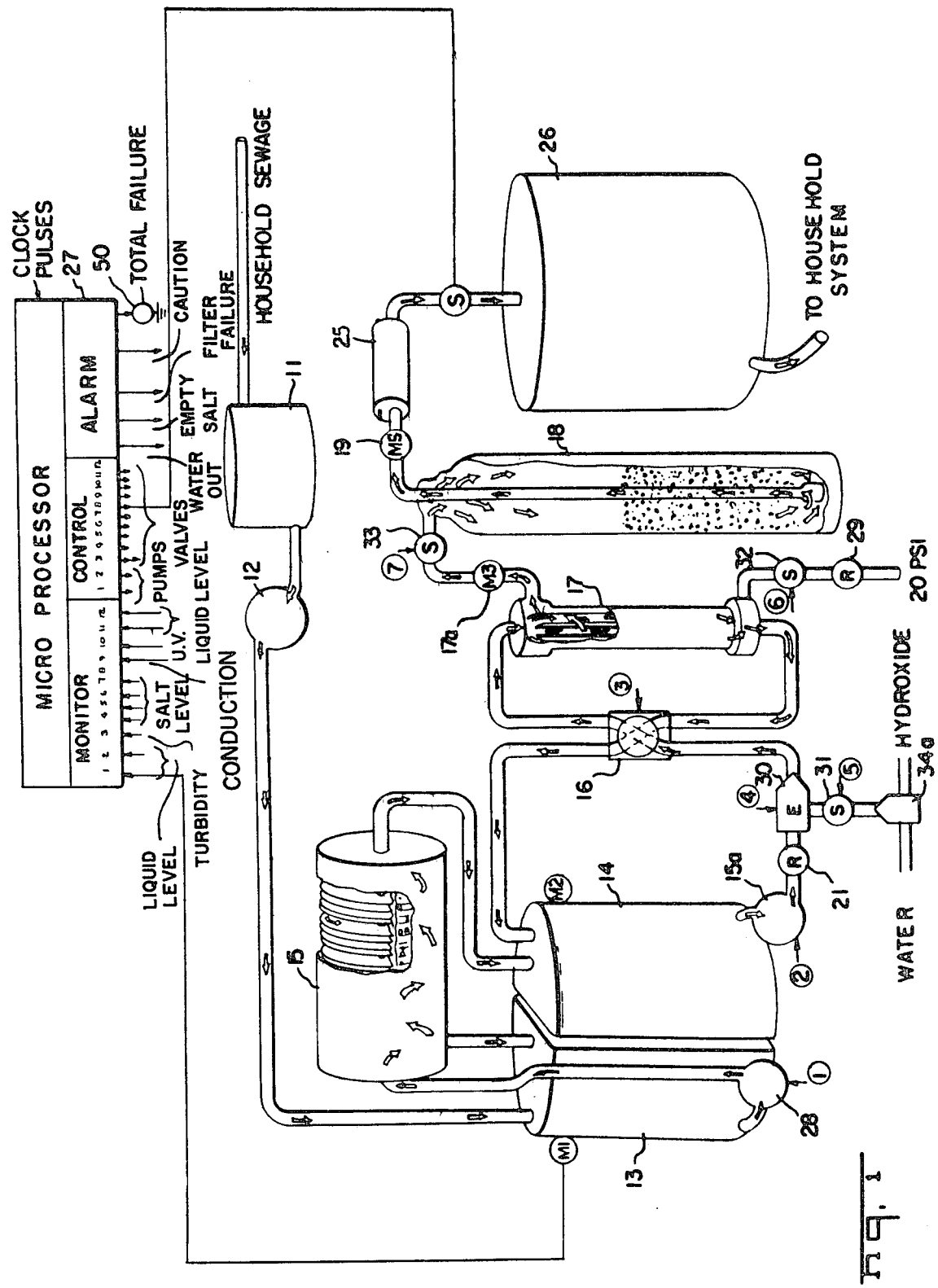

4,246,101

WATER RECYCLING SYSTEM

CROSS-REFERENCE TO RELATED APPLICATIONS

This application is a continuation-in-part of application Ser. No. 762,103, filed Jan. 24, 1977, in the name of Howard W. Selby, III now U.S. Pat. No. 4,145,279.

BACKGROUND OF THE INVENTION

This invention relates generally to waste-water processing and more particularly to an application as a closed recycling system producing potable quality water from total domestic waste-water, including household sewage.

A few municipal water treatment plants have processed total waste-water in a semi-closed system to produce potable water. However, such systems have required substantial addition of water, have not included demineralization, have been very expensive and required constant attention. Heretofore, it has been economically possible to provide such attention only in large systems.

There are many situations where a closed system is desirable to substantially reduce the total water quantity required. Shortages of water supplies or treatment capacity can be solved by complete reuse while eliminating the problems of pollution from sewage systems.

SUMMARY OF THE INVENTION

In accordance with this invention, a closed water recycling system produces potable water from waste water including sewage. A microprocessor continually monitors and operates the system, including the initiation of filter cleaning, of demineralizer operation, and control of water quality. While the invention is particularly suitable for use at a residential site, it has applicability to all water processing systems including municipal systems.

In accordance with a specific embodiment, an ion exchange bed includes at least two different resins which are acid regenerated and base regenerated. These resins can be in a variety of configurations, and are automatically taken out of service when the bed requires regeneration. Then, acid and base regenerating solutions are supplied to the appropriate beds. In accordance with the invention, the system monitors the amount of the regenerate and its progress through the beds. Rinse water is subsequently added to washout the excess regenerant and salt from the beds. The output of the rinse is followed and rinsing stopped when the majority of the salt has been eliminated. This results in a considerable savings in regenerating solution over the prior art systems in which regeneration was either overdone or stopped when the regenerate reaches the outlet. This technique also reduces the rinse water requirements because it is not necessary to flush large quantities of unused regenerating solution from the bed.

Organic absorbant may also be used either separate from the ion exchange resin or in the same container. This material is periodically cleaned in the system and optionally replaced at long intervals and cleaned outside for reuse. This absorbant removes trace organics, including many pesticides and carcinogens.

The filtration unit used may optionally be an ultra-filter. In accordance with a further aspect of this invention, such an ultra-filter module in the system may be periodically soaked with a cleaning solution, back-flushed in response to a monitored variable or otherwise regenerated. When required, the filter can be recycled, that is, water is run through the filter without a pressure differential so as to wash cake from the surface of the filter. A filter unit may also be used which requires no back-flushing to clean, as it would dissolve particle by, for example, biological digestion or other means. The invention results in a greatly increased filter life without requiring the constant personal attention which would otherwise be needed for a filter of this type.

In accordance with another aspect of this invention, the microprocessor also indicates to the user the operating condition of the system. It produces an indication, for example, by a buzzer, of a need for immediate service and of various other alarm or service requiring conditions in the system.

In accordance with another aspect of the invention, an organic reduction unit can be used to reduce organic mass and digestable solids, which might comprise a rotating disk biological digestor including various types of wheels suitable for the growth of the various bacterial ecologies of the different stages of digestion. The digestor also may incorporate a settling unit to contain both active sludge and particulate matter until it is digested. Such a settling unit may be used between each rotating disk. The wheels and the compartment baffles may also be used for settling or otherwise separating active sludge from solution. More stages of digestion will then clean the majority of organic nutrients from solution, producing water of high quality for final polishing. The reduction can also be accomplished by many other oxidative processes such as ozonation, chlorination, incineration, enzymatic breakdown or other catalysis.

The foregoing and other objects, features and advantages of the invention will be better understood from the following more detailed description and appended claims.

DESCRIPTION OF THE DRAWINGS

FIG. 1 is a view of one embodiment of the overall system;

DESCRIPTION OF THE PREFERRED EMBODIMENT

Figure 1A:
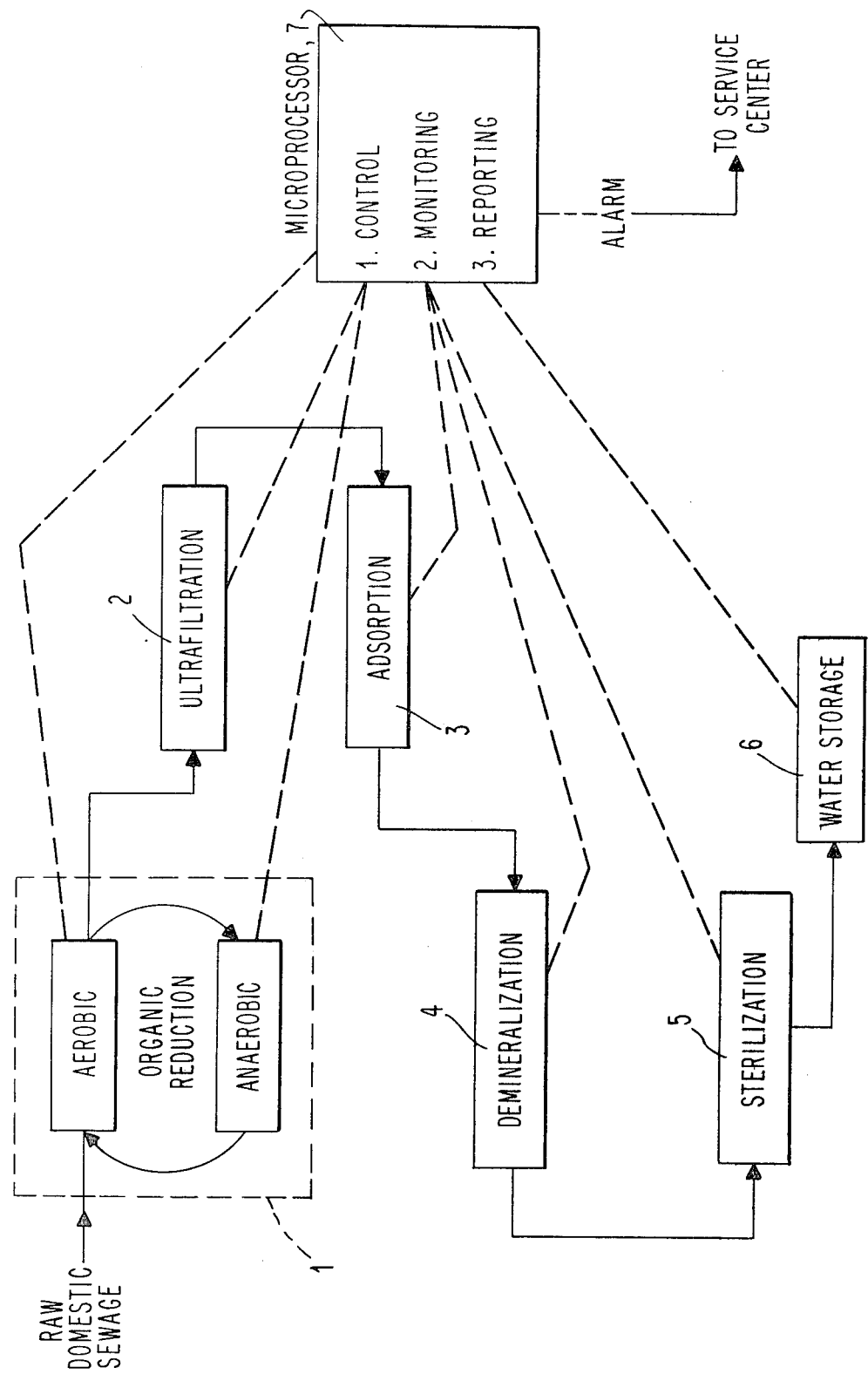
FIG. 1A is a flow diagram of the process.

Referring now to FIG. 1A, an overall flow diagram of a typical system describing the invention is shown. Raw sewage, either domestic (as shown) or municipal is directed through the system beginning in organic reduction unit 1. This unit may operate on either aerobic or anaerobic principles or other oxidative processes. This will remove dissolved organic material from the water, which is then passed into ultrafiltration unit 2 where it is thoroughly filtered for any sort of solid ingredients. An optional step is biological adsorption in unit 3 which removes organics not filtered out by ultrafilter 2. The process water is then passed to demineralizer 4 where both acidic and basic mineral ions are removed. The water is then optionally passed on to sterilizer unit 5 where it is exposed to ultraviolet light and is thus sterilized, from whence it finally passes to an optional water storage tank 6.

Throughout, the process is monitored, both as to the efficacy of the various steps and as to the control of the movement of the water from step to step, by a microprocessor indicated at 7. This microprocessor 7 receives inputs from and directs control signals to all the steps of the process, and is equipped with suitable logic to shut off the process if it malfunctions, and to control any intermittent flow or occasionally required operation such as filter back-flushing. It may be adapted to provide a continuous output of the data it gathers, to sound an alarm to indicate to the operator that some repair or malfunction beyond the control of the microprocessor needs to be corrected, and can be so arranged that an operator is not required to be present during ordinary operation of the system. With appropriate modification, the recycle system of FIG. 1A can be adapted for use by a single household or by an entire municipal water system. In either case, or on any scale in between, the objective of the system, i.e. recycle of all water used, can be achieved.

Referring now to FIG. 1, a view of the overall system as might be embodied in a household-scale plant is shown. Household sewage is supplied to holding tank 11 which supplies a pump and optional grinder 12. Solids are broken up into small particles and the resulting suspension is pumped to the buffer tank which includes a storage tank 13 for raw sewage and tank 14 for digested sewage. The buffer tank has a volume which will handle peak loads to allow even flow through the rest of the system.

A biological digestor 15 includes a horizontal shaft with rotating disks. Bacterial growth fixed to the disk is exposed to both sewage and air allowing rapid digestion of organics. The digestor may also include other rotating wheels as will subsequently be described.

Pump 15A supplies digested sewage through valving 16 to the filtration unit 17. This can be an ultrafiltration cartridge where digested sewage is pumped at a low pressure through the luman (center) of the ultrafiltration membrane; alternatively, a multi-media filtration unit which also operates at low pressure may be used here. Suitable ultrafiltration units are polymer membranes which are commercially available. Pressure is limited by reducing valve 21, a bypass valve, control on pump 15a or another pressure regulation device. Most bacteria, viruses, and larger organic molecules will remain on the input side of the filter while only water, coloring agents, organic acids, sugars, other small organics and dissolved salts pass through. Sensor M3 is a turbidity monitor (i.e., a nephelometer) which detects any breakthrough or filter failure in the system causing cloudiness in the water. This sensor constantly sends the microprocessor data on water cloudiness so in the event of filter failure it can shut down the system and sound the system down alarm.

The product water is next passed through a demineralization unit. In one embodiment, this can be a single bed 18 of mixed ion exchange resins and organic absorbants. This mixture removes organics, color and almost all inorganic salts. A conductivity sensor 19 indicates when the resin has been depleted and requires regeneration.

The ion exchange resins are homogeneously mixed in use, but must be separated into the several elements for regeneration since the resins require different regenerants. Since the resins have different specific gravities, a back-flush causes expansion allowing the lower density resins to float to the top of the heavy resin. After separation, a 4% NaOH (Sodium Hydroxide) or other base solution is flowed from the top through the resin and a 10% HCl (Hydrochloric Acid) or other acid solution is pumped up from the bottom through the more dense resin. The waste salts are drawn off through the center of the bed where the heavy and light resins are contiguous.

Monitors (not shown) continually monitor the location of the regenerate to determine when the beds have been sufficiently regenerated to be flushed. Typically, a salt band is produced during regeneration and the location of this salt band and the concentration of regenerant are monitored. When regeneration is complete, air is introduced into the bottom of the bed to mix the bed before restoring it to service.

In a second embodiment, the several resins used can be kept in different beds, through which the process water is passed in turn. Advantageously, both weak and strong acid and base resin beds are used; this results in a more efficient removal of minerals. It will be apparent that each of these beds may require regeneration using different regenerates; these can be readily provided, and the regeneration process controlled by the microprocessor as outlined above in the case of the mixed resin demineralizer. Advantageously, the various resin beds will be so sized as to require regeneration at roughly equal intervals.

After the demineralization step, the product water is now completely odorless and contains less than ten parts per million dissolved solids. As a final precaution, the water passes through an ultraviolet sterilizer 25. The use of the UV sterilizer as final sterilization gives not only irradiation capability, but the optional ability to draw in ozone ($O_3$) produced in the air above the water and drawing that $O_3$ into the water as it leaves the unit. This gives an additional element of sterilization. A catalyst can be used to prevent residual ozone from entering the distribution system.

The water may be stored in a clean water storage tank 26 where it is available for use.

The operation of the system is under the control of an integrated circuit microprocessor 27. Many commercially available chips are suitable for this purpose. Examples of microprocessors suitable for use include the 6503 chip available from MOS Technology, or integrated circuit building blocks such as Texas Instruments TTL logic series. The microprocessor responds to on-off indications from monitors as well as some analog signals which monitor the variables of the system operation. Twelve monitors are shown in FIG. 1. These are designated M-1 through M-12 and are commercially available units which operate in a suitable range. The variables which may be monitored are as follows:

| | |
|---|---|
| M-1 | Liquid level in tank 13 |
| M-2 | Liquid level in tank 14 |
| M-3 | Turbidity |
| M-4–M-8 | Salt band location monitors |
| M-9 | Conductivity |
| M-10 | Ultraviolet intensity |
| M-11 & M-12 | Liquid level in tank 26 |

In response to these monitored variables, the processor controls the system, as described as follows in connection with the embodiment shown in FIG. 1.

Pump 28 is turned on by microprocessor 27 until tank 14 is full as indicated by an output from level monitors M-2. Pump 15a is turned on only if there is enough storage space in water reservoir 26, i.e., monitor M-11 is actuated.

At intervals determined by filter pressure-drop or timing, the microprocessor performs a filter cleaning cycle. In order to do this it electrically changes the status of solenoid-operated valves. For example, valve 17a would be set to supply water which passes through the filter without a pressure differential. This washes the cake from the surface of the filter. Then a back-flushing operation is performed by reversing the positions of valves 30, 31, and 32. This allows water under pressure to flow through the filter, back through the reversing valve 16 to tank 14. This flushes out the cake which has been dislodged from the surface of the filter. When back-flush is completed, the reversing valve 16 is restored to the full line position shown in FIG. 1, and the other valves are operated to produce normal flow.

In another filter embodiment, such as the multiple resin bed arrangement described above, the same basic control scheme would be used to clean captured particles and recycle them in the system. In either technique of filtration, the backwash process which removes the collected suspended material removes that material from the filter and returns it back to the digestor for eventual digestion. This technique is desirable for the operation of the unit in that it produces the smallest possible amount of by-product which must eventually be removed manually.

The filter 17 can undergo a more thorough cleaning in response to output of monitor M-3. Depending on the filter set-up, air, mechanical agitation, line pressure water, or other methods may be employed to clean the filter at varying intervals.

Figure 2:
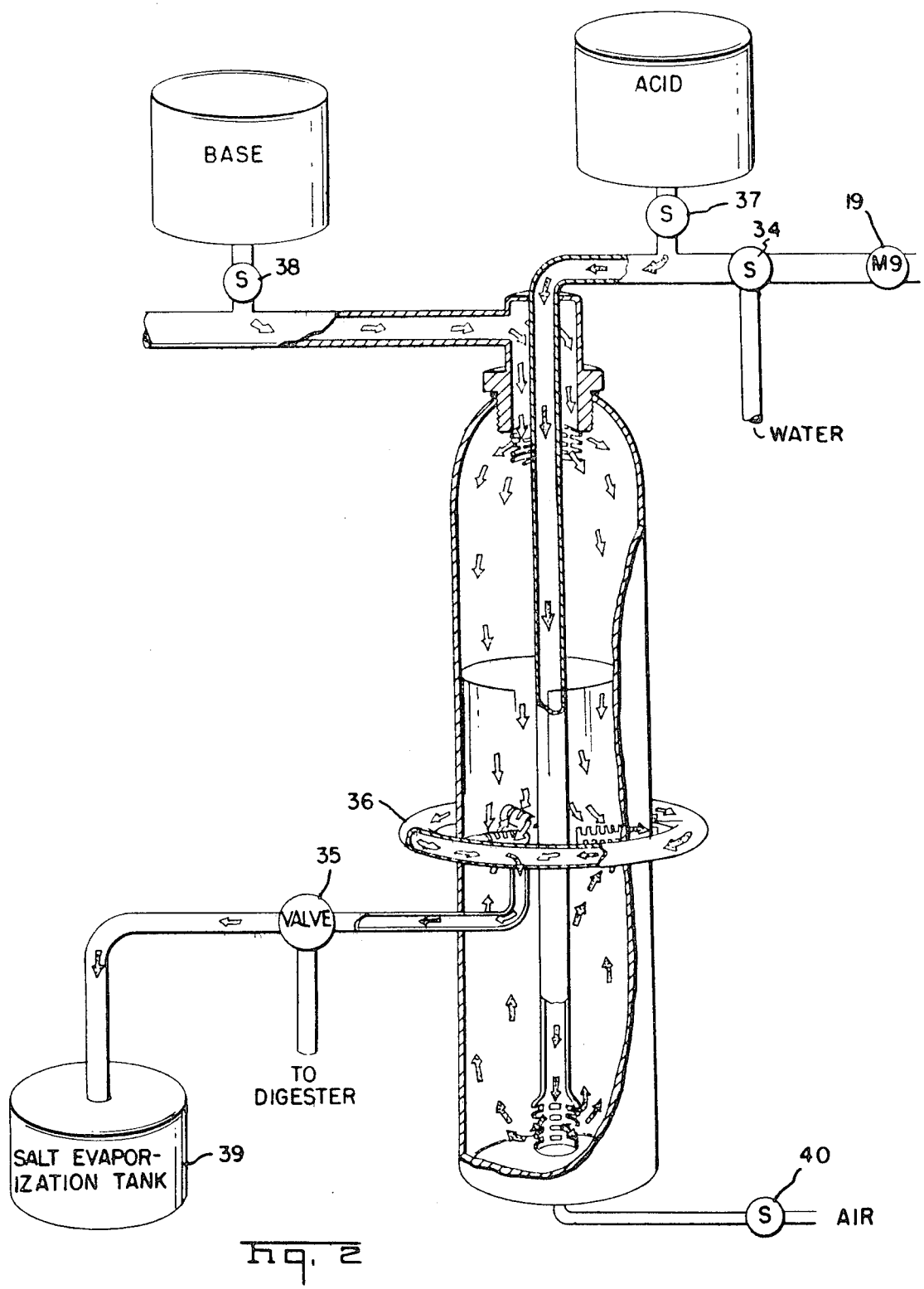
FIG. 2 shows the flow in the ion exchange bed during the regeneration mode.

In the embodiment shown in FIG. 1, ion exchange bed 18 is regenerated in response to an output from conductivity monitor M-9 indicating that regeneration is required. In response to this indication, microprocessor 27 first performs a back-flush to separate the resins into beds by specific gravity. Valve 33 is closed. Referring to FIG. 2, valve 34 is opened to the water line so that water from the reservoir flows into the bed tank up through the bed and out through the top of the tank. The water flow through the tank causes the lower density resin to float to the top of the heavy resin. After this operation, valve 34 is closed, valves 37 and 38 are opened. Valve 35 is set to the line leading to the salt evaporation tank 39 when the salt band reaches the distributor. This allows a 4% sodium hydroxide solution to flow to the top of the bed and through the light resin and 10% hydrochloric acid solution to flow up from the bottom through the heavy resins. In regeneration, the H+ ions are exchanged for sodium and calcium and other cations in the spent resins to produce NaCl and CaCl, etc. This results in a salt band which moves up in the tank as regeneration proceeds. Monitors M-4 through M-8 (not shown) monitor the position of the salt band as it moves up in the tank. Before the salt band reaches the outlet distributor 36, regeneration is stopped. A small amount of rinse water is introduced to complete the regeneration and remove the remaining salts. The valve 40 is opened to introduce air into the bottom of the bed which mixes the bed, thereby restoring it for normal service. The microprocessor closes valves 35, 37 and 38, and opens valves 33 and 34.

The foregoing is a great improvement over prior art techniques which, for example, stop regeneration when regenerate is detected at the outlet or excessive regenerate is used. In such prior art techniques, the system could not be restored to potable water production until the remaining acid was flushed from the system. Not only is this time consuming, but also it requires excessive flushing which produces excessive waste products which are unacceptable in a closed system. Precise monitoring of the regenerate reduces the flush water requirements from the normal 50 to 150 gallons per cubic foot of resin to 5 to 10 gallons of water per cubic foot.

The following is one example of a resin mixture suitable for use: one part organic absorber such as XAD-3; 5 parts weak base anion exchange resin such as IR93; and 5 parts strong cation exchange resin such as IR120, all available from Rohm and Haas Company, Philadelphia, Pa.

In the second embodiment of the demineralizer described above, the same general scheme would be used. In response to a signal that demineralizer regeneration was due, the microprocessor would cause appropriate regenerates to be fed to the various resin beds. Upon receipt of a signal that the resulting salts had reached a level close to the output tube, regeneration would be deemed to be essentially complete; the bed may then be rinsed, using a moderate amount of water, and returned to service.

In addition to the control functions just described, the microprocessor also performs alarm functions. In the event of a system failure, as indicated by the monitors, the system is shut down by the microprocessor 27 which closes all valves in the system. Concurrently, a buzzer 50 is energized to indicate system failure. Other indicators are provided to signal the user/serviceman that some action is required. For example, empty the salt evaporation tank, replace the filter, replace the ultraviolet sterilizer lamp and so on.

Figure 3:
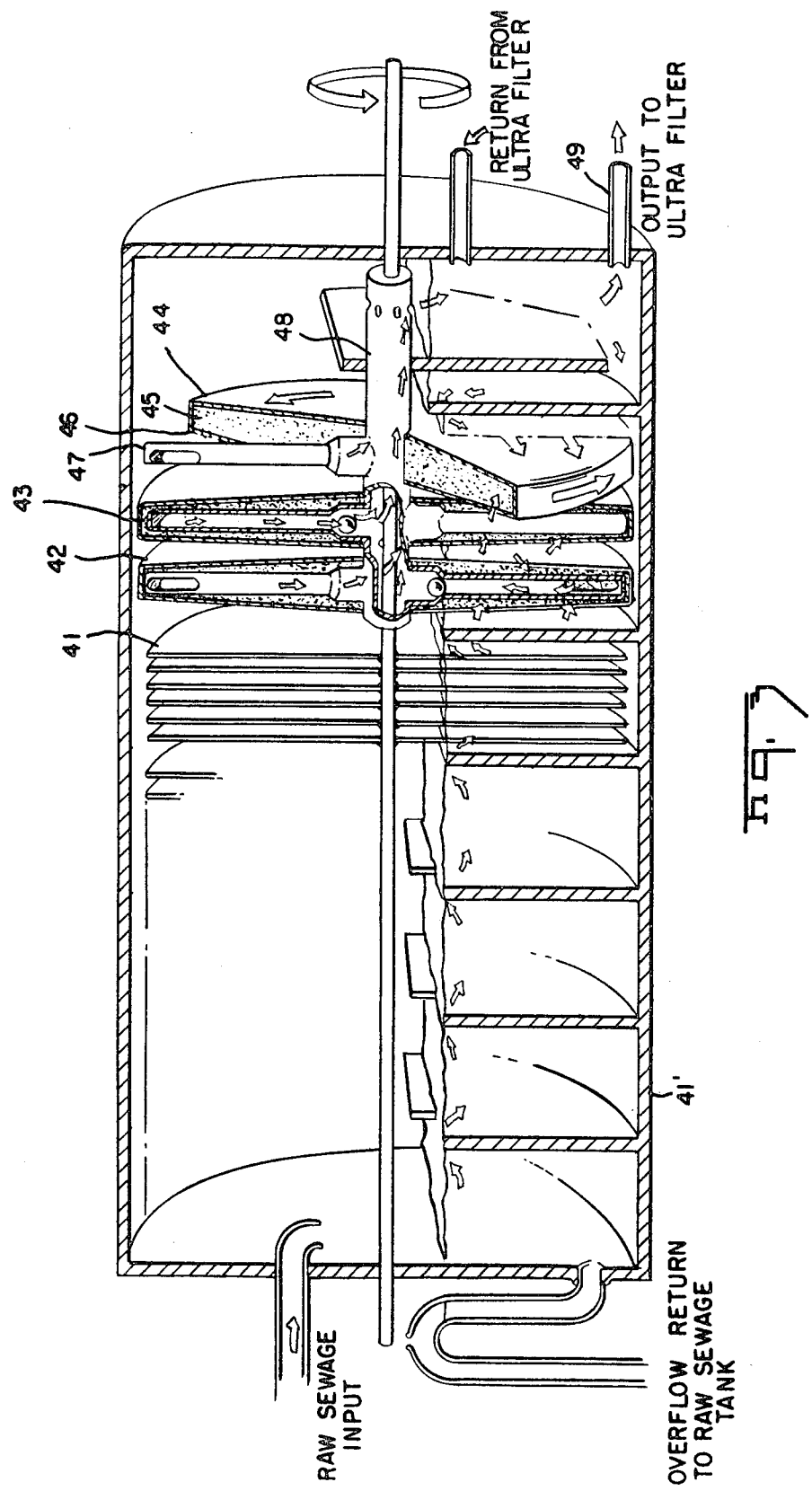
FIG. 3 shows a typical biological digestor.

Referring to FIG. 3, one suitable form of organic reduction unit comprises a biological digestor including a cylindrical tank 41', the bottom half of which is divided into compartments. Conventional bacteria disks such as 41 rotate through the sewage lying in the bottom of the tank. As the disks rotate, they expose the sewage to the air, where bacterial action works on the sewage. The biological digestor also includes unique filter pump disks 42, 43 and 44. Each of these disks includes a porous structure 45 which supports an outer permeable membrane 46. The membrane may be a felted polypropylene or dacron fiber material. Water diffuses through the membrane 46. Water scoops 47 in each of the disks scoop up the diffused water. As the scoops 47 rotate to the top, water flows through the center collector 48 to the outlet 49. Areas of the chamber located between the individual disks or groups of disks may also be positioned off, from one another, thus providing settling areas between the biological separation areas.

An absorption unit (not shown) may also be used, advantageously after the biological digestor, to finally remove additional organic material.

Finally, the system is preferably exposed to ultraviolet (UV) light in UV chamber 25, thus disinfecting the water before it passes to holding tank 26.

Figure 4:
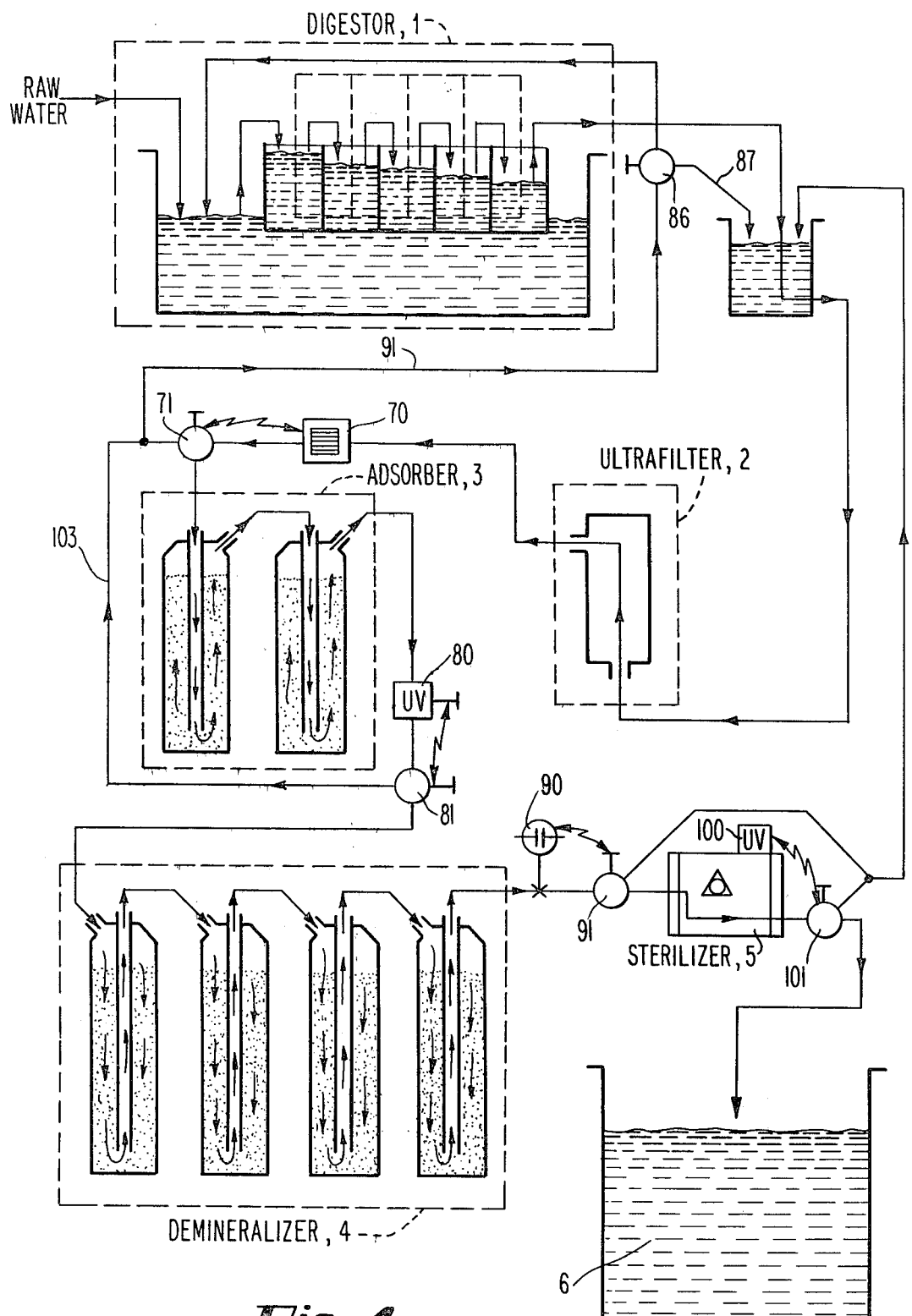
FIG. 4 shows an alternative embodiment of the system.

FIG. 4 shows a schematic representation of another embodiment of the system of the invention which is useful in all closed cycle water recycling systems, and which can be adapted to the recycling of any amount of used water, simply by up-or down-sizing of its various components. As in the system shown above with reference to FIGS. 1 and 1A, the system provides a total recycle capability where, apart from inevitable evaporation losses in the various industrial and household operations, essentially all water is recycled and reused an indefinite number of time. The system is also effective in an open mode without recycling.

The system of FIG. 4 conforms to the schematic diagram of FIG. 1A. Water is first processed through a biological digestor 1, then is passed through an ultrafilter unit 2, an optional absorption unit 3, a demineralizing system 4, an optional sterilizer 5, and winds up in an optional reservoir 6. The digestor 1 is a unit generally similar to that described in more detail by FIG. 3 and the discussion thereof above. Water is collected in a sump and is picked up by rotating discs which are covered with organic digestive organisms such as bacteria and the like, whereby organic particles in solution in the raw sewage are digested by the bacteria, thus removing them from the solution. The bacteria then tend to fall to the bottom of the digestor unit 1, settle, and are removed from the sump. In this way, biological matter dissolved in the water is essentially turned into carbon dioxide and water by the action of the bacteria, thus removing it from the sewage.

The water is then passed through ultrafilter unit 2 which may be a unit similar to that described above with reference to FIG. 1. Naturally, such units may be enlarged or ganged in parallel to provide larger treatment capacity. It is, in general, desirable to monitor the operation of the ultrafilter 2 by installation of a nephelometer 70 in the process stream after the ultrafiltration unit. Such a nephelometer is a commercially available unit which is adapted to measure the turbidity of the water, thus providing an indication of the amount of small particles in suspension in the water. The nephelometer may be installed in the process line immediately after the ultrafilter unit or at any later point. In some cases, it is desirable to install the nephelometer in a point in the line where the water does not tend to have air dissolved in it as such air forms bubbles which can, in some cases, increase the density or turbidity of the water, thus causing the nephelometer to falsely indicate that a high level of suspended matter is present.

If the nephelometer 70 is installed as shown in FIG. 4, after the ultrafilter unit 2, a valve 71 may conveniently be provided to respond to the output of the nephelometer 70 via the intermediary of the microprocessor to send any water which gives a high reading on the nephelometer back either to the ultrafiltration stage via return lines 91 and 88 or into the biological digestor via 91 and 87. A valve 86 is controlled in response to the output of the nephelometer 70, to send the water via either line 87 or line 88. Valves 71 and 86 may readily be operated by the microprocessor.

Presuming that the water has passed the test of the nephelometer 70, it may then be passed through an optional adsorption system 3. This can be a conventional absorber made up of one or more beds containing a fine powder such as charcoal or carbon which tends to remove hydrophobic organic matter from the water. Several different beds may be provided, and may contain different media. This is suitable for removing those organic molecules which are more inclined to bond to the media in the adsorption unit than to remain in the water; i.e., hydrophobic molecules. The efficacy of the operation of the adsorption system 3 can be monitored by an ultraviolet absorbance unit 80 which generally is located after the demineralizer. In this way, the amount of the organic material remaining in the water can be monitored because the organic molecules tend to absorb the ultraviolet light. A signal from this monitor 80 can be passed to the microprocessor and used to control a valve 81 which, if the level of organics in the water stream is too high, will direct the water to be returned via return line 103 to an earlier stage in the process for reprocessing.

Presuming that the water has passed this monitor 80 with adequate results, the water is then passed through demineralization system 4. This may be a demineralizer such as that described above with respect to FIG. 2 or may be one of any of a number of differing types. In this embodiment, the demineralization system 4 consists of a number, preferably four or six, of resin beds which, unlike those shown in the demineralizer unit of FIG. 2, each contain only one sort of resin. In this way, the various resins can be selected which give more complete, economical or efficient removal than would otherwise be possible. Resins with special characteristics but which would not be sufficient alone can be used with other complimentary products. For example, one bed can be selected for high regeneration efficiency which is desirable for a closed system. However, as such resins do not remove certain minerals which are unionized in solution, it can be used in conjunction with a "salt splitting" resin. Such resins do not have as high an efficiency, but by utilizing both, a reasonable efficiency with full removal capacity can be achieved.

After the demineralization step, the quality of the water is measured by conductivity monitor 90 which, by measuring the electrical conductivity of the water across two electrodes in the water stream, gives a good indication of the ionic concentration within the water. This, of course, is a direct indication of the amount of TDS present in the water since such dissolved minerals tend to be ionic when in low concentration. If the output of the conductivity monitor 90 is such as to indicate that the mineral level is too high, a valve 91 is provided and controlled by the microprocessor unit acting on the signal of conductivity monitor 91 so as to direct the water stream via return lines 105 and 106 back to an earlier stage in the process for reprocessing.

Assuming that the conductivity monitor has indicated that the water quality is acceptable from this point of view, the water is optionally passed through the final processing step, that of sterilization in sterilizer unit 100. There, ultraviolet light is beamed onto the water stream for final sterilization by using the ultraviolet light to kill any organims in the water. The operation of this ultraviolet unit can be sensed by a monitor 100 similar to that denominated ultraviolet unit 80, which measures the ability of the water to pass the ultraviolet light through without attenuation which gives a measure of the quantity of organic material within the water, and of the level of U.V. radiation available for sterilization. Again, a valve 101 is controlled by the microprocessor in response to the signal from ultraviolet sensor 100; if the sensor 100 indicates that the water quality is poor, it is returned via return line 105 to an early stage of the process for reprocessing. If the ultraviolet sensor 100 indicates that the water quality is acceptable, it is passed to a potable water tank 6 for use as desired, or directly into the process stream.

It will be appreciated by those skilled in the art that the embodiments of the invention described above are subject to considerable modification in order to achieve the same basic goal, i.e., a total water recycle system which can operate in a closed cycle without the addition of additional water from the outside. It has been found by applicant that the steps of digestion, ultrafiltration, and demineralization are such as to provide a water system with this capability, which is not found in the prior art. In some cases, adsorption and sterilization are useful. Moreover, it will be apparent to those skilled in the art that the individual units of the invention can be made in forms other than those described in detail above. For example, ultrafiltration as a means of solid-liquid separation can be replaced with an electrophoretic separation system as described in ELECTROPHORESIS, Vol. 1 and 2, M. Bier Ed. Academic Press N.Y. 1967; or with a magnetohydrodynamic system wherein an electrical potential is applied across the water stream so as to attract the oppositely charged particles to the electrodes, thus permitting them to be collected and removed from the water stream. Other modifications will, no doubt, appear to those skilled in the art.

One possibility includes the replacement or the ultrafilter 2 discussed above, which is of the porous-membrane type, with a multimedia filter, wherein the water is caused to flow through a quantity of fine grained media such as sand, coal or garnet which will remove fine particles suspended in the water.

The system has the capability of using low cost uncompensated, low accuracy sensors and using the microprocessor to perform all of the necessary compensation as well as correction calculations. The microprocessor can do computation of the input data, do analysis, and optimize the operation of the system as well as operate the system unattended. The microprocessor provides constant surveillance of the operation of each of the components of the system: filtration by monitoring turbidity, resin bed operation by measuring conductivity, sterilization by measuring UV intensity, in addition to monitoring the transmission of water, the temperature at critical points, and the level of water in the several tanks. Fail-safe controls can shut down the system or part of the system and/or warn of a system failure or need for service. An optional printer may be controlled by the CPU to print out water quality and/or diagnostic data.

Microprocessor as used herein means an electronic controller having logic capability built as a single chip (an integrated circuit), by use of a number of integrated circuits, or by discrete components.

While a particular embodiment of the invention has been shown and described, varying modifications may be made without departing from the true spirit and scope of the invention. The appended claims are, therefore, intended to cover all such modifications.

What is claimed is:

1. A water treatment system capable of producing potable quality water from waste-water with recycle capability comprising:
   a solid-liquid separation unit for removing virus, bacteria, organic molecules, and other suspended particles from said waste-water,
   an organic reduction unit for the breaking down and elimination of substantially all of the organic content of said waste-water,
   a demineralizer for removing organic materials, color, and inorganic salts from said waste-water,
   monitoring means for monitoring the operation of such solid-liquid separation unit and said demineralizer, and
   a microprocessor responsive to the output of said monitoring means for
      (a) controlling the intermittent flow of water between said solid-liquid separation unit, said organic reduction unit and said demineralizer,
      (b) controlling the operation of said filtration unit and of said demineralizer, and
      (c) monitoring water quality.

2. The system as claimed in claim 1 wherein said microprocessor controls the operation of the demineralizer which comprises a bed including at least two different resins which are acid and base regenerated and which have different specific gravities,
   an outlet near the middle of said bed for removing regenerate solution during regeneration, and
   a regeneration monitor in said bed connected to said microprocessor to provide a signal before the entire bed is regenerated,
   said monitoring means including a bed monitor at the output of said bed for indicating when said resins have been depleted and require regeneration,
   said microprocessor controlling means for back-flushing said bed in response to the indication of said bed monitor, thus separating said resins according to their specific gravity,
   said microprocessor controlling means for supplying an acidic regenerating solution to one side of said bed and a basic regenerating solution to the other side of said bed in response to the indication from said bed monitor, and
   said microprocessor being adapted to respond to the signal of said regeneration monitor and stop the supply of said solutions.

3. The system cited in claim 2 wherein said regeneration monitor is a salt monitor positioned a distance from said outlet such that the salt band produced during regeneration by ion exchange in said bed is detected before it reaches said outlet.

4. The system recited in claim 1 wherein said organic reduction unit is a biological digestor comprising:
   rotating disks in a tank partially filled with waste-water which is exposed to the air as said disks rotate.

5. The system recited in claim 4 wherein said biological digestor further comprises:
   at least one hollow rotating wheel having a permeable outer membrane, said waste-water diffusing through said permeable membrane to the inside of said wheel, and
   a wheel scoop for transferring and controlling water from inside the wheel to an outlet of the biological digestor.

6. The system of claim 1 wherein the solid-liquid separation unit is a filtration unit.

7. The system recited in claim 1 wherein said monitoring means includes:
   a filter monitor producing an output indicating that said filtration unit requires back-flushing, and
   means controlled by said microprocessor for back-flushing said filtration unit in response to the output of said filter monitor.

8. The system recited in claim 1 further comprising a sterilizer for final sterilization of processed water.

9. The system of claim 1 further comprising an absorption unit to remove dissolved organics from the water.

10. The system of claim 1 wherein said demineralizer is an electrodialysis unit.

11. The method of recycling waste-water into potable water comprising:
   biologically digesting substantially all the organic component of said waste-water,
   filtering virus, bacteria and organic molecules from said waste-water,
   passing said waste-water through ion exchange resins to remove organic materials, color, and inorganic salts,
   monitoring or timing the requirement for back-flushing of the filter and conductivity of water passing through said ion exchange resins in said bed, and
   controlling the intermittent back-flushing of said filter and the regeneration of said resins by means of a microprocessor adapted to respond to said monitoring or timing.

12. The method recited in claim 11 wherein said resins are in a bed which includes at least two different resins which are acid regenerated and base regenerated and which have different specific gravities, said resins being mixed during the operation of said system, said method further comprising:
   continually monitoring the operation of said system to indicate when said bed requires regeneration,
   in response to the foregoing indication, separating said resins according to specific gravity by flushing water through said bed,
   supplying an acidic regenerating solution to one side of said bed and a basic regenerating solution to the other side of said bed,
   monitoring the level of the regenerant and of the salt band produced by ion exchange in said bed, and
   automatically stopping the flow of regenerating solution to said bed before said regenerant reaches the outlet of said bed, thereby permitting the regenerating solution remaining to complete regeneration.

13. A closed water recycling system producing potable water from waste-water comprising:
   a biological digester for decomposing substantially all the organic portion of said waste-water,
   a filtration unit including an ultra-filter membrane for removing virus, bacteria and organic molecules from said waste-water,
   a demineralizer containing multiple ion exchange resins removing certain organic molecules, color and inorganic salts,
   means for moving water between said digester, said filtration unit, and said demineralizer which are connected in a closed recycling system,
   monitoring means for monitoring the operation of said system, and
   a microprocessor responsive to the output of said monitoring means for controlling said means for intermittently moving water.

14. The system recited in claim 13 further comprising an adsorption component, following biological digestion, to further remove certain organic materials.

15. The system of claim 13 wherein said demineralizer comprises multiple beds of ion exchange resins, said resins being chosen to chemically remove ionized molecules from said waste-water.

16. The system recited in claim 13 wherein the microprocessor includes reporting capability.

17. The system recited in claim 13 further comprising an evaporator to reduce liquid discharge from the demineralizer.

18. The system recited in claim 13 further comprising a sewage grinder.

19. A total water recycling system for treatment of raw water comprising:
   a solid-liquid separation unit for removing solid particles suspended in said water therefrom,
   an organic reduction unit for removing substantially all organic material dissolved in the water therefrom,
   a demineralization unit for removing non-organic material dissolved in the water therefrom,
   monitor means for monitoring the operation of said solid-liquid separation, organic reduction, and demineralization units; and
   microprocessor means for controlling the system in response to the output of the monitor means.

20. The system as recited in claims 1, 13 or 19 further comprising a reservoir to allow the system to handle intermittent input into the system.

21. The system as recited in claims 1, 13 or 19 with a reservoir to allow the system to handle intermittent use of the processed water.

22. The system as recited in claims 1, 13 or 19 further comprising an electronic monitor and controller means adapted to monitor water quality.

23. The system as recited in claims 1, 13 or 19 further comprising an electronic controller means adapted to monitor and respond to fail-safe variables to prevent system malfunction or sub-standard water quality.

24. The system as recited in claims 1, 13 or 19 further comprising microprocessor means adapted to report to a central service center or other location and transfer information and diagnostic data.

25. The system as recited in claims 1 or 19 wherein said organic reduction unit comprises a catalytic oxidation unit.

* * * * *